US008368251B2

(12) United States Patent
Ashikawa

(10) Patent No.: US 8,368,251 B2
(45) Date of Patent: Feb. 5, 2013

(54) IMAGE FORMING APPARATUS, IMAGE FORMING METHOD IN IMAGE FORMING APPARATUS, AND COMPUTER PROGRAM PRODUCT

(75) Inventor: Yoshihisa Ashikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 296 days.

(21) Appl. No.: 12/849,325

(22) Filed: Aug. 3, 2010

(65) Prior Publication Data

US 2011/0031807 A1 Feb. 10, 2011

(30) Foreign Application Priority Data

Aug. 4, 2009 (JP) ................................ 2009-181492
Jul. 30, 2010 (JP) ................................ 2010-172949

(51) Int. Cl.
*H02J 1/00* (2006.01)
*H02J 3/00* (2006.01)

(52) U.S. Cl. .............................. 307/82; 399/37; 399/88

(58) Field of Classification Search .................... 307/82, 307/39
See application file for complete search history.

(56) References Cited

U.S. PATENT DOCUMENTS

2007/0071479 A1* 3/2007 Semma et al. .................. 399/88
2008/0226330 A1* 9/2008 Nakazawa et al. .............. 399/88
2008/0309161 A1* 12/2008 Jung .............................. 307/17
2010/0272463 A1* 10/2010 Inukai ............................ 399/88

FOREIGN PATENT DOCUMENTS

JP 2004-276588 10/2004

* cited by examiner

*Primary Examiner* — Rexford Barnie
*Assistant Examiner* — Toan Vu
(74) *Attorney, Agent, or Firm* — Oblon, Spivak, McClelland, Maier & Neustadt, L.L.P.

(57) ABSTRACT

There is provided an image forming apparatus includes: a first electric-power supply path, through which electric power is supplied from a commercial electric power supply to the apparatus when the first electric-power supply path is in closed state; a second electric-power supply path, through which electric power is supplied from the commercial electric power supply to the apparatus when, at least, a detecting unit has detected that the first electric-power supply path is in the open state; and a plurality of drive-voltage generating units, each of which converts a voltage fed from the electric power supply through any one of the first electric-power supply path and the second electric-power supply path into a predetermined drive voltage; a plurality of systems, to each of which the drive voltage converted by a corresponding one drive-voltage generating unit of the drive-voltage generating units is fed.

15 Claims, 11 Drawing Sheets

IMAGE FORMING APPARATUS, IMAGE FORMING METHOD IN IMAGE FORMING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2009-181492 filed in Japan on Aug. 4, 2009 and Japanese Patent Application No. 2010-172949 filed in Japan on Jul. 30, 2010.

BACKGROUND OF THE INVENTION

1. Field of the Invention

The present invention is directed generally to an image forming apparatus, an image forming method in an image forming apparatus, and a computer program product.

2. Description of the Related Art

Image forming apparatuses that have, as one of operating modes, a power save mode (hereinafter, "sleep mode") to reduce electric power consumption when the apparatus is idle have been conventionally provided. An image forming apparatus having a power save mode typically reduces electric power consumption when idle (hereinafter, "sleep-mode power consumption") by causing the apparatus to stop operating after a predetermined period of receiving no operating input. However, even while the image forming apparatus is in the power save mode, the apparatus is still consuming a small amount of electric power. In view of the circumstances, for further reduction of sleep-mode power consumption and improvement in safety, a technique of turning off a power switch of an apparatus to thereby cut off the apparatus from power supply has been employed.

However, cutting off an image forming apparatus that includes, for instance, a hard disk drive, from power supply in response to switch-off of a power switch can result in occurrence of an inconvenient condition to be described below. Specifically, when the apparatus is cut off from the power supply while the apparatus is making access to the hard disk drive, data loss, data damage, improper writing of essential data to the hard disk drive, or the like inconvenient condition can occur. To this end, image forming apparatuses having shutdown function have been provided in recent years (see, e.g., Japanese Patent Application Laid-open No. 2004-276588). When a power switch of such an image forming apparatus having the shutdown function is switched off, power supply to the apparatus is cut off upon completion of operation that has been during processing at the instant of switch-off of the power switch rather than immediately after the switch-off of the power switch.

As described above, an image forming apparatus having the shutdown function is typically configured such that power supply to the apparatus is cut off upon completion of operation that has been during processing at the instant of switch-off of power switch. Accordingly, in the image forming apparatus having the shutdown function, electric power is continuously supplied not only to a device involved in operation that has been during processing at the instant of switch-off of the power switch but also to other devices that are not involved in the operation until completion of the operation, resulting in waste of electric power disadvantageously.

SUMMARY OF THE INVENTION

It is an object of the present invention to at least partially solve the problems in the conventional technology.

According to an aspect of the present invention, there is provided an image forming apparatus that includes: a first electric-power supply path, through which electric power is supplied from a commercial electric power supply to the apparatus when the first electric-power supply path is in closed state; a detecting unit that detects whether the first electric-power supply path is in open state or in the closed state; a second electric-power supply path, through which electric power is supplied from the commercial electric power supply to the apparatus when, at least, the detecting unit has detected that the first electric-power supply path is in the open state; and a plurality of drive-voltage generating units, each of which converts a voltage fed from the electric power supply through any one of the first electric-power supply path and the second electric-power supply path into a predetermined drive voltage; a plurality of systems, to each of which the drive voltage converted by a corresponding one drive-voltage generating unit of the drive-voltage generating units is fed. Each of the systems includes: an execution unit that, when the detecting unit has detected that the first electric-power supply path is in the open state, performs a system-shutdown procedure on the drive voltage fed to the system through the second electric-power supply path and the corresponding one drive-voltage generating unit; and a stopping unit that causes the corresponding one drive-voltage generating unit to stop operating immediately when the execution unit has completed the system-shutdown procedure, and the second electric-power supply path stops supplying the electric power when all the drive-voltage generating units have been caused to stop operating.

According to another aspect of the present invention, there is provided an image forming method in an image forming apparatus that includes a first electric-power supply path, through which electric power is supplied from a commercial electric power supply to the apparatus when the first electric-power supply path is in closed state, a detecting unit that detects whether the first electric-power supply path is in open state or in the closed state, a second electric-power supply path, through which electric power is supplied from the commercial electric power supply to the apparatus when, at least, the detecting unit has detected that the first electric-power supply path is in the open state, a plurality of drive-voltage generating units, each of which converts a voltage fed from the electric power supply through any one of the first electric-power supply path and the second electric-power supply path into a predetermined drive voltage, and a plurality of systems, to each of which the drive voltage converted by a corresponding one drive-voltage generating unit of the drive-voltage generating units is fed. The image forming method includes causing each of the systems to perform a system-shutdown procedure on the drive voltage fed to the system through the second electric-power supply path and the corresponding one of the drive-voltage generating units when the detecting unit has detected that the first electric-power supply path is in the open state; causing each of the systems to cause the corresponding one drive-voltage generating unit to stop operating immediately when the execution unit has completed the system-shutdown procedure; and causing the second electric-power supply path to stop supplying the electric power when all the drive-voltage generating units have been caused to stop operating.

According to still another aspect of the present invention, there is provided a computer program product that causes a computer to execute the method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Configurations of image forming apparatuses and shutdown procedures therefor according to exemplary embodiments of the present invention are described in detail below with reference to the accompanying drawings.

First Embodiment

Figure 1:
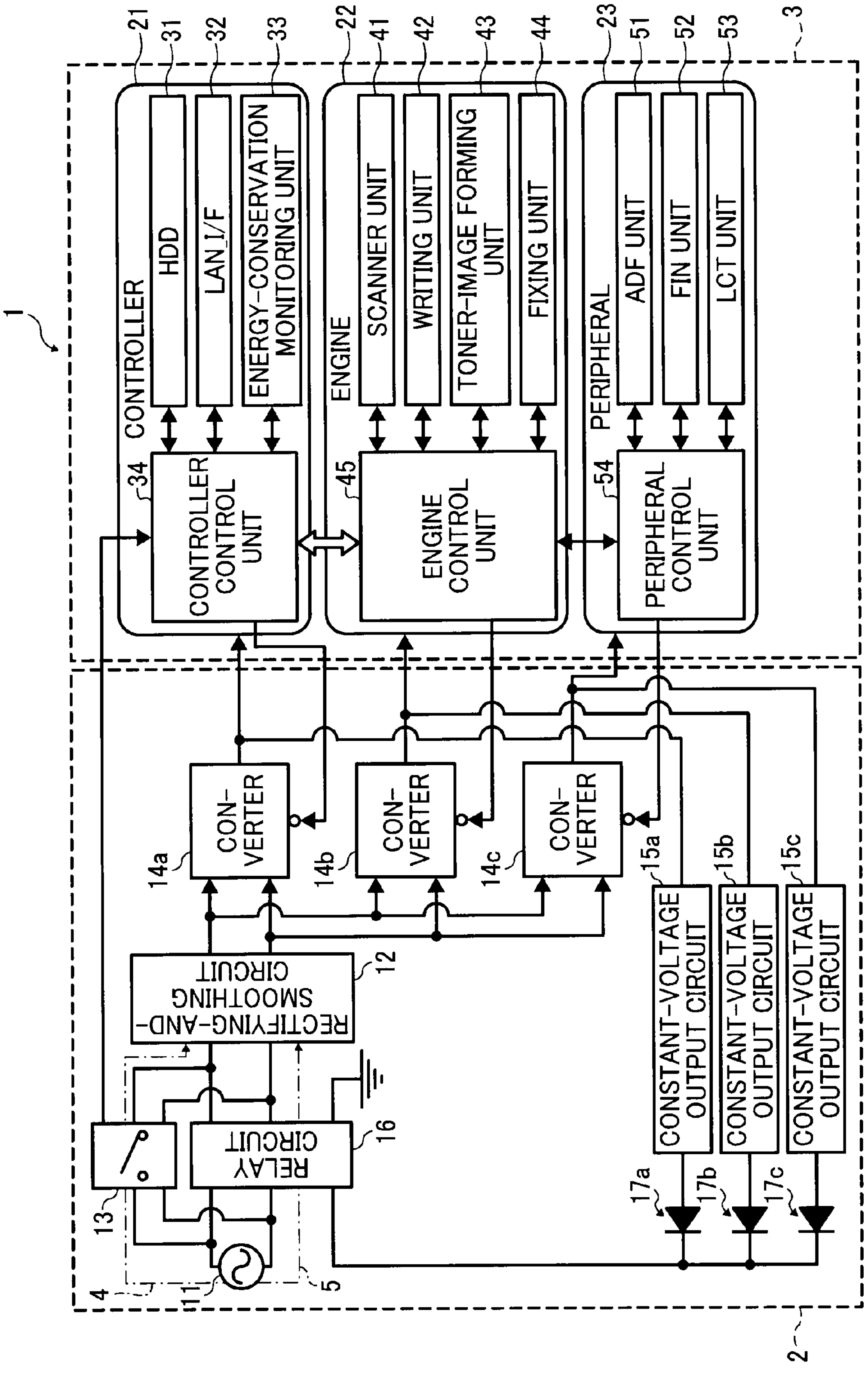
FIG. 1 is a block diagram of an image forming apparatus according to a first embodiment of the present invention.

The configuration of an image forming apparatus according to a first embodiment of the present invention will be described with reference to FIG. 1.

An image forming apparatus 1 according to the first embodiment is embodied as a known image forming apparatus, such as a printer, a copier, a scanner, a facsimile, or a multifunction peripheral (MFP) that is unitary apparatus that provides one or more of functions of these machines. As indicated in FIG. 1, the image forming apparatus 1 includes, as its major elements, a power control system 2 that controls electric power supply to the image forming apparatus 1 and a main-body control system 3 that controls operations performed by the entirety of the image forming apparatus 1.

The power control system 2 includes a power supply 11, a rectifying-and-smoothing circuit 12, a power switch 13, converters 14*a*, 14*b*, and 14*c*, constant-voltage output circuits 15*a*, 15*b*, and 15*c*, a relay circuit 16, and diodes 17*a*, 17*b*, and 17*c*. A path that runs through the power supply 11, the power switch 13, and the rectifying-and-smoothing circuit 12 is referred to as a first electric-power supply path 4. A path that runs through the power supply 11, the relay circuit 16, and the rectifying-and-smoothing circuit 12 is referred to as a second electric-power supply path 5. In the description that follows, "the path is in the closed state" means that the path is connected. In contrast, "the path is in the open state" means that the path is disconnected.

The power supply 11, which is an electric-power supply device, such as a commercial electric power supply, delivers alternating-current (AC) voltage in the first embodiment. The rectifying-and-smoothing circuit 12 transforms AC voltages output from the power supply 11 into direct-current (DC) voltages by performing known rectification and smoothing. The converters 14*a*, 14*b*, and 14*c* convert DC voltages output from the rectifying-and-smoothing circuit 12 into a voltage appropriate for driving a controller 21, a voltage appropriate for driving an engine 22, and a voltage appropriate for driving a peripheral 23 of the main-body control system 3 according to an on/off control signal fed from the controller 21, an on/off control signal fed from the engine 22, and an on/off control signal fed from the peripheral 23, respectively, and delivers the thus-converted voltages thereto.

The power switch 13 is an open-close switch to be operated by a user to switch connecting and disconnecting between the power supply 11 to the rectifying-and-smoothing circuit 12. With the power switch 13 on, the first electric-power supply path 4 is in the closed state. With the power switch 13 off, the first electric-power supply path 4 is in the open state. The power switch 13 has a detecting function for detecting on/off state of its own and delivers information (hereinafter, referred to as "on/off signal") indicative of a detected on state or off state to the controller 21. The power switch 13 functions as a first-path opening/closing unit that opens and closes the first electric-power supply path 4 and as the detecting unit. The power switch 13 that functions as the detecting unit can be configured to include, for instance, a detection switch that mechanically opens and closes dependent on on/off switching of the power switch 13. The detection switch is connected to a 5-volt power supply, a ground, and the controller 21 and outputs, to the controller 21, an on/off signal that indicates whether electric current from the 5-volt power supply is flowing to the ground. Note that the power switch 13 does not necessarily have the function for detecting on/off state of the power switch 13, and an alternative configuration, in which a detecting unit is provided separately from the power switch 13, can be employed. With this alternative configuration, for instance, a zero-crossing detecting circuit can be provided at a subsequent stage of the power switch 13 so that the zero-crossing detecting circuit detects on/off state of the power switch 13. The constant-voltage output circuits 15*a*, 15*b*, and 15*c* produce drive voltages for the relay circuit 16 from the DC voltages output from the converters 14*a*, 14*b*, and 14*c*, respectively, and delivers the drive voltages to the relay circuit 16 via the diodes 17*a*, 17*b*, and 17*c*, through which elimination of counter-electromotive force is done. The converters 14*a*, 14*b*, and 14*c* serve as drive-voltage generating units.

The relay circuit 16 and the power switch 13 are in parallel arrangement. The relay circuit 16 connects and disconnects the power supply 11 and the rectifying-and-smoothing circuit 12 in a switching manner by using the drive voltages fed from the constant-voltage output circuits 15*a*, 15*b*, and 15*c*. With the relay circuit 16 on, the second electric-power supply path 5 is in the closed state. With the relay circuit 16 off, the second electric-power supply path 5 is in the open state. The relay circuit 16 functions as a second-path opening/closing unit that opens and closes the second electric-power supply path 5. In the first embodiment, the relay circuit 16 is a relay circuit of a normally-open contact type. Put another way, when output from at least one of the converters 14*a*, 14*b*, and 14*c* is on, the relay circuit 16 is placed in a contact-closed state (connecting state) where the rectifying-and-smoothing circuit 12 is connected to the power supply 11. In contrast, if outputs from all of the converters 14*a*, 14*b*, and 14*c* are off, the relay circuit 16 is placed in a contact-open state (cutoff state) where the rectifying-and-smoothing circuit 12 is cut off from the power supply 11. In this image forming apparatus 1, if the power switch 13 is off and the relay circuit 16 is in the contact-open state, connection between the power supply 11 and the main-body control system 3 is completely cut off.

The main-body control system 3 includes the controller 21, the engine 22, and the peripheral 23. The controller 21, the engine 22, and the peripheral 23 are configured such that these devices can be controlled in a distributed manner independent from one another and can exchange information with one another via electrical wiring and interface circuit. Each of the controller 21, the engine 22, and the peripheral 23 corresponds to a system (hereinafter, referred to as "the device" in some cases) in aspects of the present invention.

The controller 21 includes a hard disk drive (HDD) 31, a local area network (LAN)_interface (I/F) 32, an energy-conservation monitoring unit 33, and a controller control unit 34. The HDD 31, which is a known hard disk recording device, stores various electronic data, such as image data. The LAN_I/F 32 controls information exchange between the image forming apparatus 1 and external equipment. The energy-conservation monitoring unit 33 detects a return event, in response to which an operating mode related to operation of the power switch 13, operating status of an automatic document feeder (ADF) unit 51, and the like is returned from an energy-conserving operating mode to a normal operating mode.

The controller control unit 34 includes an application specific integrated circuit (ASIC) and an interface circuit for the ASIC and controls operations performed by the entirety of the controller 21 according to input signals fed from the LAN_I/F 32 and the energy-conservation monitoring unit 33 and an on/off signal fed from the power switch 13. The ASIC includes a central processing unit (CPU), read only memory (ROM), random access memory (RAM), and first-in first-out (FIFO) memory. Control program instructions are stored in the ROM in the ASIC. The CPU in the ASIC loads the control program instructions stored in the ROM into the RAM and executes the control program instructions loaded into the RAM to thereby control operations performed by the entirety of the controller 21. In the first embodiment, the controller control unit 34 has a function of turning on and off output from the converter 14*a*. The controller control unit 34 serves as an execution unit and a stopping unit in aspects of the present invention.

The control program instructions stored in the ROM in the ASIC can be provided as being recorded in a computer-readable recording medium, such as a compact disk read only memory (CD-ROM), a flexible disk (FD), a compact disk recordable (CD-R), or a digital versatile disk (DVD), in an installable format or an executable format. The control program instructions stored in the ROM in the ASIC can be provided as being stored in a computer connected to a network such as the Internet so that the control program instructions can be downloaded via the network. The control program instructions stored in the ROM in the ASIC can be provided or distributed via a telecommunication line, such as the Internet.

The engine 22 includes a scanner unit 41, a writing unit 42, a toner-image forming unit 43, a fixing unit 44, and an engine control unit 45. The scanner unit 41 is a device that optically scans an original to obtain image data. The writing unit 42 is a device that writes the image data obtained by the scanner unit 41 onto a photosensitive drum. The toner-image forming unit 43 is a device that develops the image data written onto the photosensitive drum by the writing unit 42 with toner into a toner image, which is visible, and transfers the toner image onto a transfer device. The fixing unit 44 is a device that applies heat and pressure to the toner image transferred onto the transfer device so as to fix the toner image onto printing paper, thereby forming an image on the printing paper. The engine control unit 45 includes an ASIC and an interface circuit for the ASIC that are similar to those of the controller control unit 34, and controls operations performed by the entirety of the engine 22. Control program instructions are stored in ROM in the ASIC. A CPU in the ASIC loads the control program instructions stored in the ROM into RAM in the ASIC and executes the control program instructions loaded into the RAM to thereby control operations performed by the entirety of the engine 22. In the first embodiment, the engine control unit 45 has a function of turning on and off output from the converter 14*b*. The engine control unit 45 serves as the execution unit and the stopping unit in aspects of the present invention.

The peripheral 23 includes the ADF unit 51, a finisher (FIN) unit 52, a large capacity tray (LCT) unit 53, and a peripheral control unit 54. The ADF unit 51 is a device that automatically feeds originals to the scanner unit 41. The FIN unit 52 is a device that performs finishing operations, such as punching, stacking, and sorting, on printed paper delivered from the fixing unit 44. The LCT unit 53 is a device capable of containing a large volume of printing paper and feeding printing paper therefrom. The peripheral control unit 54 includes an ASIC and an interface circuit for the ASIC that are similar to those of the controller control unit 34, and controls operations performed by the entirety of the peripheral 23. Control program instructions are stored in ROM in the ASIC. A CPU in the ASIC loads the control program instructions stored in the ROM into RAM in the ASIC and executes the control program instructions loaded into the RAM to thereby control operations performed by the entirety of the peripheral 23. In the first embodiment, the peripheral control unit 54 has a function of turning on and off output from the converter 14*c*. The peripheral control unit 54 serves as the execution unit and the stopping unit in aspects of the present invention.

Figure 2:
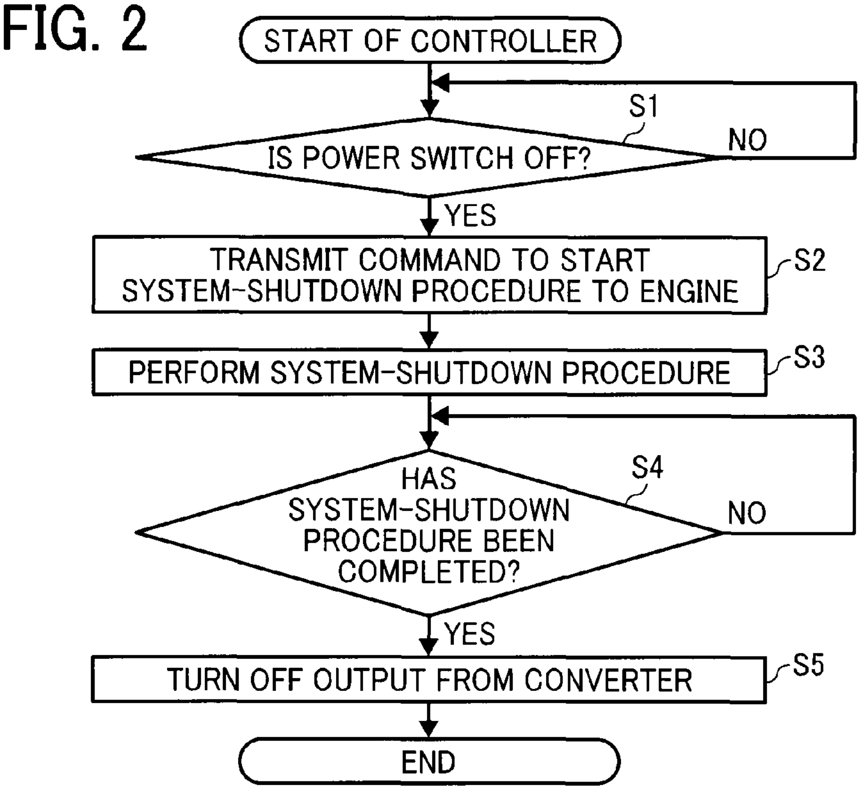
FIG. 2 is a flowchart illustrating a shutdown procedure for a controller illustrated in FIG. 1.
Figure 3:
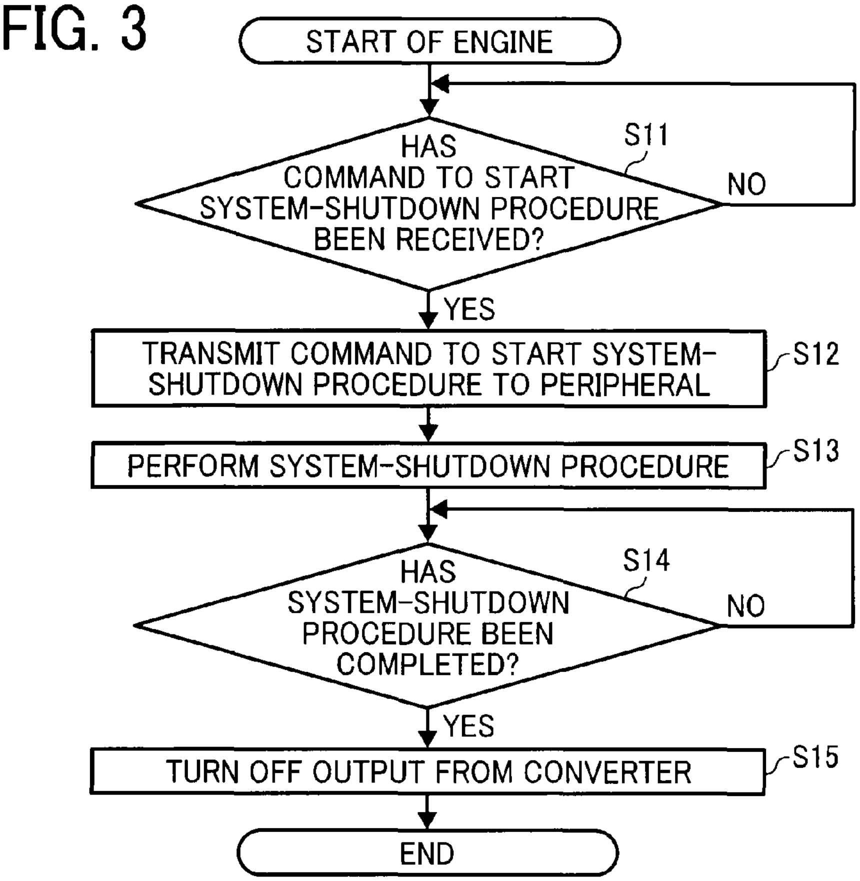
FIG. 3 is a flowchart illustrating a shutdown procedure for an engine illustrated in FIG. 1.
Figure 4:
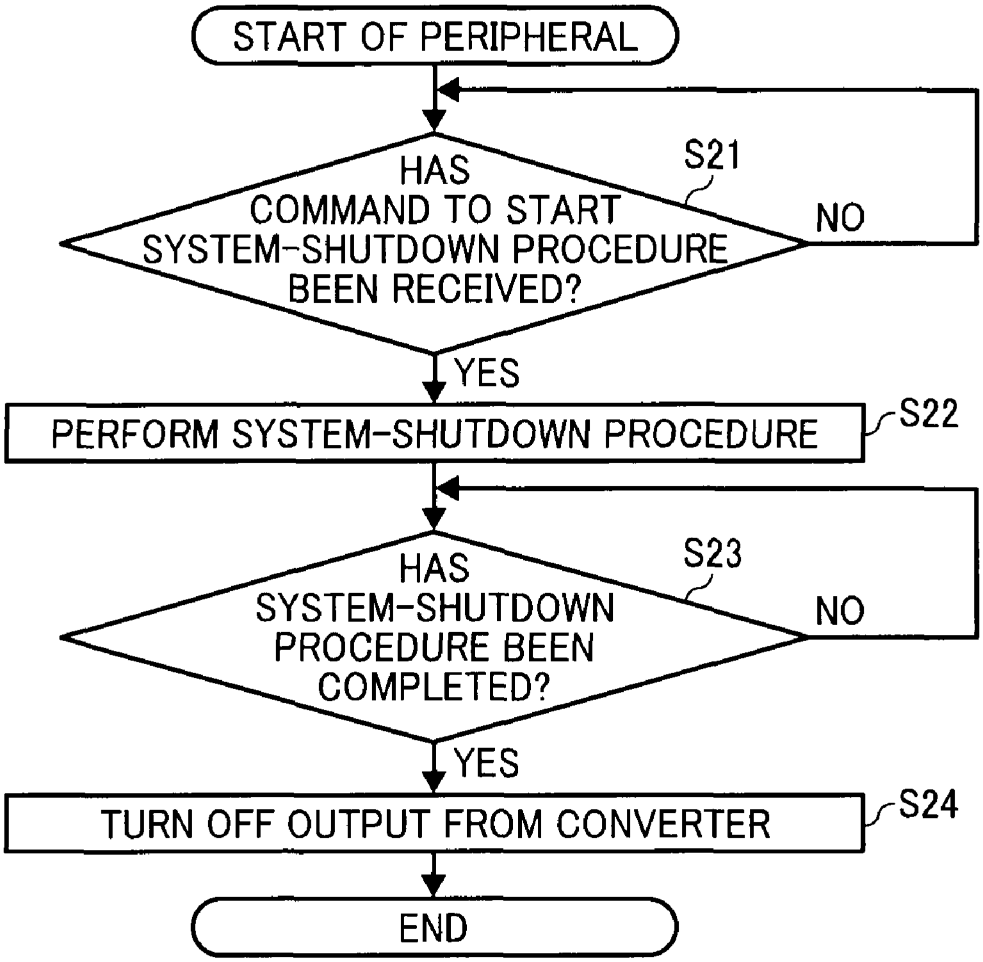
FIG. 4 is a flowchart illustrating a shutdown procedure for a peripheral illustrated in FIG. 1.

In the image forming apparatus 1 configured as described above, the controller 21, the engine 22, and the peripheral 23 perform a shutdown procedure to be described below in a parallel manner, thereby reducing power consumption. How the controller 21, the engine 22, and the peripheral 23 operate when performing the shutdown procedure will be described below with reference to the flowcharts illustrated in FIG. 2 to FIG. 4. FIG. 2, FIG. 3, and FIG. 4 are a flowchart for operations performed by the controller 21, a flowchart for operations performed by the engine 22, and a flowchart for operations performed by the peripheral 23, respectively, each performing the shutdown procedure.

With reference to the flowchart illustrated in FIG. 2, how the controller 21 operates when performing the shutdown procedure will be described below.

Control in the flowchart for the shutdown procedure illustrated in FIG. 2 starts at start of electric power supply from the converter 14*a* and proceeds to Step S1.

At Step S1, the controller control unit 34 determines, based on an on/off signal output from the power switch 13, whether the power switch 13 has been switched from on to off. Upon determining that the power switch 13 has been switched from on to off, the controller control unit 34 causes control to proceed to Step S2 in the shutdown procedure.

At Step S2, the controller control unit 34 transmits a command to start system-shutdown procedure to the engine 22 via the electrical wiring. When processing pertaining to Step S2 is thus completed, control proceeds to Step S3 in the shutdown procedure.

At Step S3, the controller control unit 34 performs the system-shutdown procedure for the controller 21 of its own. The system-shutdown procedure for the controller 21 of its own includes a procedure for completing operation (e.g., making access to the HDD 31) that is currently performed by the controller 21 and a basic shutdown procedure that includes protecting various units in the controller 21, writing system cache, and closing program files that are open for use by control program instructions. When processing pertaining to Step S3 is thus completed, control proceeds to Step S4 in the shutdown procedure.

At Step S4, the controller control unit 34 determines whether the system-shutdown procedure has been completed. Upon determining that the system-shutdown procedure has been completed, the controller control unit 34 causes control to proceed to Step S5 in the shutdown procedure.

At Step S5, the controller control unit 34 turns off output from the converter 14*a* that delivers electric power to the controller 21, thereby stopping electric power supply to the controller 21. When processing pertaining to Step S5 is thus completed, the shutdown procedure is completed.

With reference to the flowchart illustrated in FIG. 3, how the engine 22 operates when performing the shutdown procedure will be described below.

Control in the flowchart for the shutdown procedure illustrated in FIG. 3 starts at start of electric power supply from the converter 14*a* and proceeds to Step S11.

At Step S11, the engine control unit 45 determines whether the command to start system-shutdown procedure has been received from the controller control unit 34. Upon receiving the command to start system-shutdown procedure from the controller control unit 34, the engine control unit 45 causes control to proceed to Step S12 in the shutdown procedure.

At Step S12, the engine control unit 45 transmits a command to start system-shutdown procedure to the peripheral 23 via the electrical wiring. When processing pertaining to Step S12 is thus completed, control proceeds to Step S13 in the shutdown procedure.

At Step S13, the engine control unit 45 performs the system-shutdown procedure for the engine 22 of its own. The system-shutdown procedure for the engine 22 of its own includes a procedure for completing operation (e.g., image-control operation) that is currently performed by the engine 22 and a basic shutdown procedure that includes protecting various units in the engine 22, writing system cache, and closing program files that are open for use by control program instructions. When processing pertaining to Step S13 is thus completed, control proceeds to Step S14 in the shutdown procedure.

At Step S14, the engine control unit 45 determines whether the system-shutdown procedure has been completed. Upon determining that the system-shutdown procedure has been completed, the engine control unit 45 causes control to proceed to Step S15 in the shutdown procedure.

At Step S15, the engine control unit 45 turns off output from the converter 14*b* that delivers electric power to the engine 22, thereby stopping electric power supply to the engine 22. When processing pertaining to Step S15 is thus completed, the shutdown procedure is completed.

With reference to the flowchart illustrated in FIG. 4, how the peripheral 23 operates when performing the shutdown procedure will be described below.

Control in the flowchart for the shutdown procedure illustrated in FIG. 4 starts at start of electric power supply from the converter 14*c* and proceeds to Step S21.

At Step S21, the peripheral control unit 54 determines whether the command to start system-shutdown procedure has been received from the engine control unit 45. Upon receiving the command to start system-shutdown procedure from the engine control unit 45, the peripheral control unit 54 causes control to proceed to Step S22 in the shutdown procedure.

At Step S22, the peripheral control unit 54 performs the system-shutdown procedure for the peripheral 23 of its own. The system-shutdown procedure for the peripheral 23 of its own includes a procedure for completing operation (e.g., ADF scanning operation) that is currently performed by the peripheral 23 and a basic shutdown procedure that includes protecting various units in the peripheral 23, writing system cache, and closing program files that are open for use by control program instructions. When processing pertaining to Step S22 is thus completed, control proceeds to Step S23 in the shutdown procedure.

At Step S23, the peripheral control unit 54 determines whether the system-shutdown procedure has been completed. Upon determining that the system-shutdown procedure has been completed, the peripheral control unit 54 causes control to proceed to Step S24 in the shutdown procedure.

At Step S24, the peripheral control unit 54 turns off output from the converter 14*c* that delivers electric power to the peripheral 23, thereby stopping electric power supply to the peripheral 23. Because all outputs from the converters 14*a*, 14*b*, and 14*c* are off at this stage, the relay circuit 16 is placed in a contact-open state where the engine 22, the controller 21, and the peripheral 23 are completely cut off from the power supply 11. When processing pertaining to Step S24 is thus completed, the shutdown procedure is completed.

A specific example of the shutdown procedure described above will be described with reference to a timing diagram illustrated in FIG. 5.

Assume that the power switch 13 is switched from on to off (T=T1, where T denotes time in FIG. 5) while the controller 21 and the peripheral 23 are on standby and the engine 22 is performing image-control operation.

When the power switch 13 is switched from on to off in this situation, the controller 21, the engine 22, and the peripheral 23 independently perform their system-shutdown procedures in parallel to one another. Specifically, the controller 21 and the peripheral 23, each of which is currently not performing operation, perform only their basic shutdown procedures as the system-shutdown procedures as indicated in zones (b) and (f) in FIG. 5. In contrast, as indicated in zone (d) in FIG. 5, the engine 22, which is currently performing an image-control operation, performs a procedure that includes continuously performing and then completing the image-control operation and its basic shutdown procedure as the system-shutdown procedure.

Figure 5:
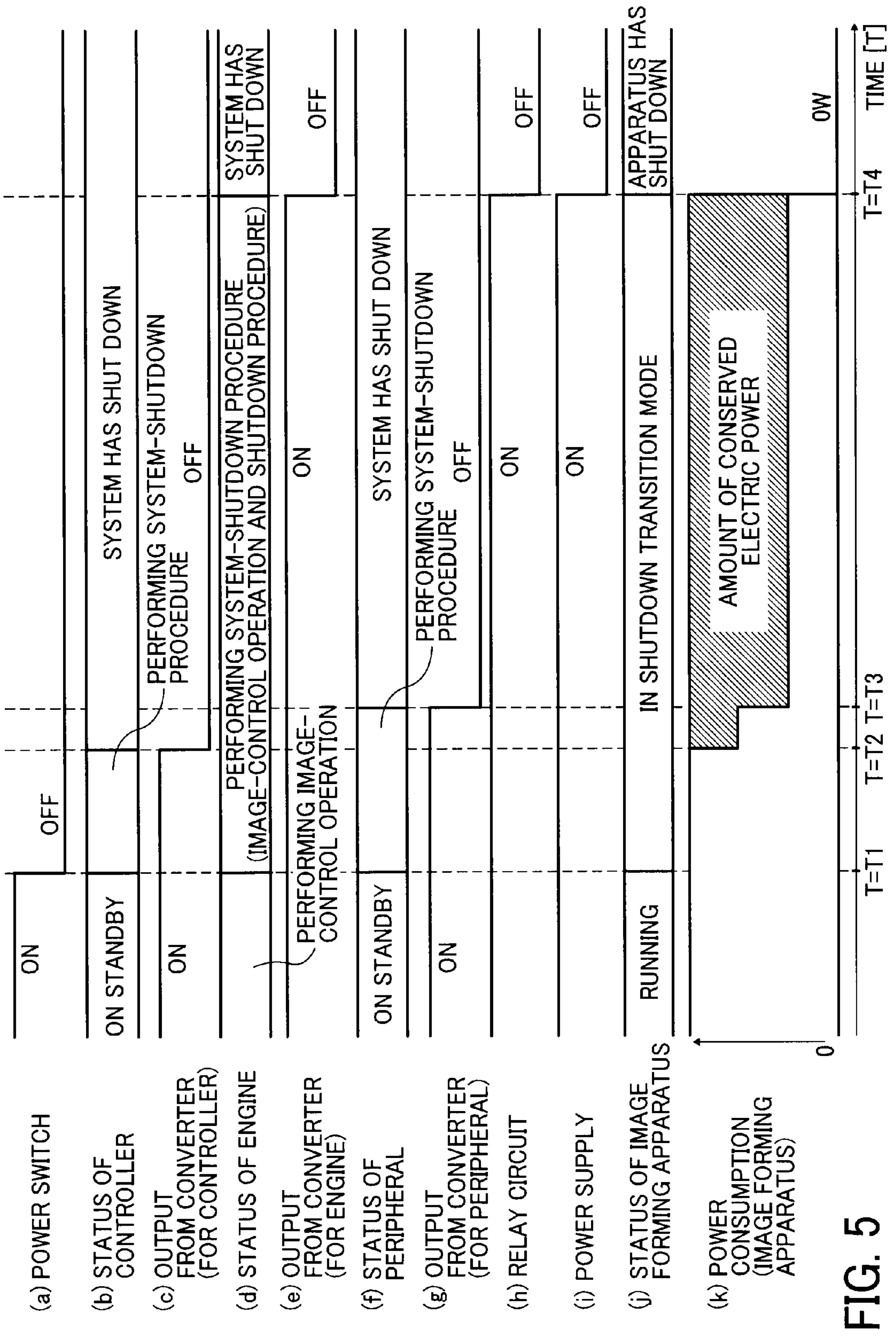
FIG. 5 is a timing diagram illustrating an example shutdown procedure for the image forming apparatus illustrated in FIG. 1.

As is clear from comparison among zones (b), (d), and (f) of FIG. 5, a period of time required by the engine 22 to complete its system-shutdown procedure is longer than each of a period of time required by the controller 21 to complete its system-shutdown procedure and that required by the peripheral 23 to complete its system-shutdown procedure. To this end, the image forming apparatus 1 is configured such that output from the converter 14*a* is turned off (T=T2, where T denotes time in FIG. 5) upon completion of the system-shutdown procedure for the controller 21 (see (c) of FIG. 5) and output from the converter 14*c* is turned off (T=T3, where T denotes time in FIG. 5) upon completion of the system-shutdown procedure for the peripheral 23 (see (g) of FIG. 5).

Accordingly, an amount of electric power consumed over a period of time from switch-off of the power switch 13 to complete cut-off of the controller 21, the engine 22, and the peripheral 23 from the power supply 11 (power consumption between T1 and T4) is reduced by an amount corresponding to a diagonally-shaded area in zone (k) of FIG. 5 as compared to electric power consumption of a conventional image forming apparatus, in which electric power is continuously supplied to the controller 21 and the peripheral 23 even while the engine 22 is performing its system-shutdown procedure.

Although the operation example where the engine 22 itself is performing operation when the power switch 13 is switched from on to off has been described, power consumption can be similarly reduced even in a situation where at least one of the controller 21 and the peripheral 23 itself is performing operation when the power switch 13 is switched from on to off.

Specifically, when the power switch 13 is switched from on to off while the image forming apparatus 1 is performing an image-forming operation, the controller 21 performs, as its system-shutdown procedure, an operation of preventing printing paper that is currently located upstream than printing paper being conveyed on a conveying path from being fed to the conveying path and the basic shutdown procedure for the controller 21. The engine 22 performs, as its system-shutdown procedure, and an image-forming operation and a paper-delivering operation on the printing paper being conveyed on the conveying path in cooperation with the controller 21 and the basic shutdown procedure for the engine 22. The peripheral 23 performs, as its system-shutdown procedure, a finishing operation on the printing paper delivered from the engine 22 and the basic shutdown procedure for the peripheral 23. Because each of the devices turns off output of a corresponding one of the converters upon completion of its own system-shutdown procedure, power consumption can be reduced as compared with that of conventional image forming apparatus in which electric power is continuously supplied to all devices in the apparatus until all the devices have completed their system-shutdown procedures.

An image forming apparatus that has a conventional shutdown function is typically configured such that electric power supply to the apparatus is cut off at completion of operation that has been during processing at the instant of switch-off of a power switch. In such a typical conventional image forming apparatus, when the power switch is switched from on to off while an engine is performing an image-control operation, the apparatus is cut off from the power supply after completion of the image-control operation. Accordingly, in the conventional image forming apparatus, electric power is continuously supplied not only to the engine but also to other devices, such as a controller and a peripheral, that are not involved in the image-control operation until completion of the image-control operation.

Similarly, in the conventional image forming apparatus, when power switch is switched from on to off while the apparatus is performing an ADF scanning operation, such as scan of a large volume of originals or double-sided scan, the apparatus is cut off from the power supply after completion of the ADF scanning operation. Accordingly, in the conventional image forming apparatus, electric power is continuously supplied not only to a device involved in the ADF scanning operation but also to other devices, such as a fixing unit and an image-forming unit, that are not involved in the ADF scanning operation until completion of the ADF scanning operation.

Similarly, in the conventional image forming apparatus, when the power switch is switched from on to off while the apparatus is storing in its HDD a large amount of data from external source, the power supply to the apparatus is cut off after the data has been stored in the HDD. Accordingly, in the conventional image forming apparatus, electric power is continuously supplied not only to a device involved in the operation of storing data in the HDD (hereinafter, "storing-data-in-HDD operation") but also to other devices, such as a peripheral and an engine, that are not involved in the storing-data-in-HDD operation until completion of the storing-data-in-HDD operation.

Put another way, conventional image forming apparatuses are configured such that electric power is continuously supplied not only to a device involved in an operation that has been during processing at the instant of switch-off of a power switch but also to other devices that are not involved in the operation until completion of the operation, thereby disadvantageously wasting electric power.

In contrast, as described above, the image forming apparatus 1 according to the first embodiment is configured such that when the power switch 13 is switched off, each of the controller 21, the engine 22, and the peripheral 23 independently performs its own system-shutdown procedure on drive voltage fed thereto via the relay circuit 16 and a corresponding one of the converters 14*a*, 14*b*, and 14*c*. Each of the controller 21, the engine 22, and the peripheral 23 turns off output of a corresponding one of the converters upon completion of its own system-shutdown procedure; and the relay circuit 16 cuts off the corresponding one of the devices from the power supply 11 when outputs from all the converters 14*a*, 14*b*, and 14*c* have been turned off.

Put another way, the image forming apparatus 1 according to the first embodiment is configured such that system-shutdown procedures are distributed among the controller 21, the engine 22, and the peripheral 23 to be performed by the devices in parallel and each of the devices stops power supply to the own device upon completion of each device's system-shutdown procedure. Hence, the image forming apparatus 1 according to the first embodiment prevents electric power from being continuously supplied unnecessarily to devices of the apparatus that are not involved in an operation that has been during processing at the instant of switch-off of the power switch 13 until completion of the operation, thereby preventing electric power wasting.

In the first embodiment, although the system-shutdown procedures and power-supply control procedure are distributed among the three devices, or specifically the controller 21, the engine 22, and the peripheral 23, the system-shutdown procedures and the power-supply control procedure can be distributed in any fashion. In the first embodiment, although the relay circuit 16 cuts off each of the devices from the power supply 11 upon completion of the system-shutdown procedure for the device, any device and/or control method for cutting off each of the devices from the power supply 11 can alternatively be employed so long as the device and/or control method allows each of the devices to be cut off from the power supply 11 upon completion of the system-shutdown procedure for the device.

Second Embodiment

The configuration of an image forming apparatus according to a second embodiment of the present invention will be described with reference to FIG. 6.

Figure 6:
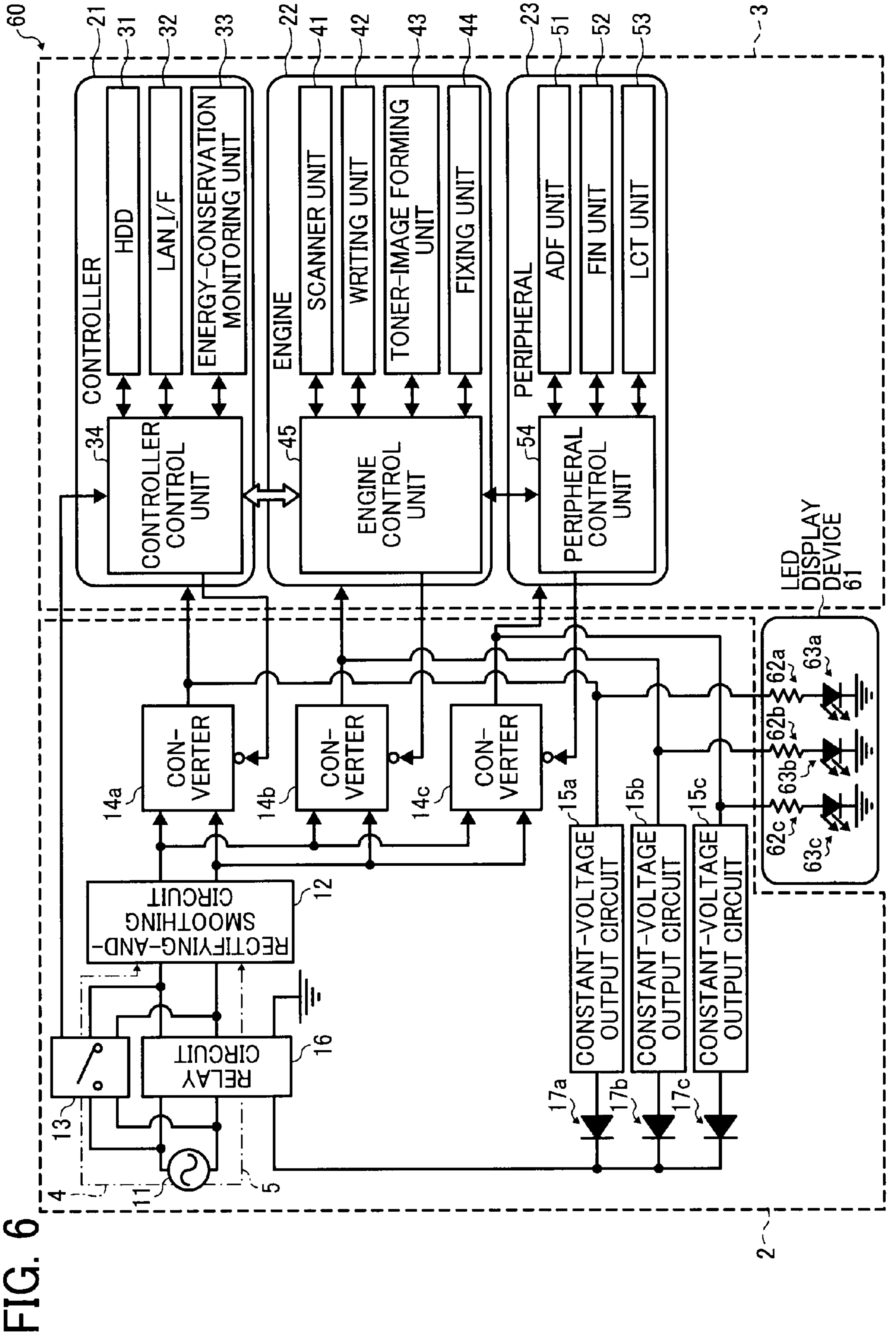
FIG. 6 is a block diagram of an image forming apparatus according to a second embodiment of the present invention.

As indicated in FIG. 6, the configuration of an image forming apparatus 60 according to the second embodiment differs from the configuration of the image forming apparatus 1 according to the first embodiment in additionally including a light-emitting diode (LED) display device 61 that is located in the vicinity of a control panel or a like position where the LED display device 61 is visible to a user. Because elements of the image forming apparatus 60 are similar to those of the image forming apparatus 1 described above except for the LED display device 61, the like elements are denoted by the same reference numerals and symbols, and only the configuration of the LED display device 61 will be described below. The LED display device 61 serves as a display unit and a light-emitting unit in an aspect of the present invention.

The LED display device 61 includes an LED 63*a* connected to an output terminal of the converter 14*a* via a resistor 62*a*, an LED 63*b* connected to an output terminal of the converter 14*b* via a resistor 62*b*, and an LED 63*c* connected to an output terminal of the converter 14*c* via a resistor 62*c*. Each of the LED 63*a*, the LED 63*b*, and the LED 63*c* is lit when output from a corresponding one of the converters 14*a*, 14*b*, and 14*c* is on but unlit when output from the corresponding one of the converters 14*a*, 14*b*, and 14*c* is off.

As described above in the first embodiment, after the power switch 13 has been switched off, output from each of the converters 14*a*, 14*b*, and 14*c* is switched from on to off upon completion of the system-shutdown procedure for a corresponding one of the controller 21, the engine 22, and the peripheral 23. Accordingly, the image forming apparatus 60 according to the second embodiment allows a user to check running statuses of the system-shutdown procedures for the devices and connection statuses between the devices and the power supply 11 by observing illumination statuses of the LEDs that are to be changed depending on on/off of outputs from the converters 14*a*, 14*b*, and 14*c*.

Although the LEDs are individually provided for outputs from the three converters in the second embodiment, a single LED can alternatively be provided at a subsequent stage of a diode where outputs from the three converters are combined together. This alternative configuration, which can be constructed less expensively, does not allow a user to check individual statuses of the system-shutdown procedures for the devices, but allows the user to check whether all the devices have completed their system-shutdown procedures and connection statuses between the power supply 11 and the devices by checking whether the single LED has been switched from a lit state to an unlit state.

As is clear from the description above, the image forming apparatus according to the second embodiment is configured such that the LED display device 61 is lit depending on running statuses of the system-shutdown procedures for the devices, a user can check the running statuses of the system-shutdown procedures for the devices and connection statuses between the power supply 11 and the devices with ease.

Third Embodiment

The configuration of an image forming apparatus according to a third embodiment of the present invention will be described with reference to FIG. 7.

Figure 7:
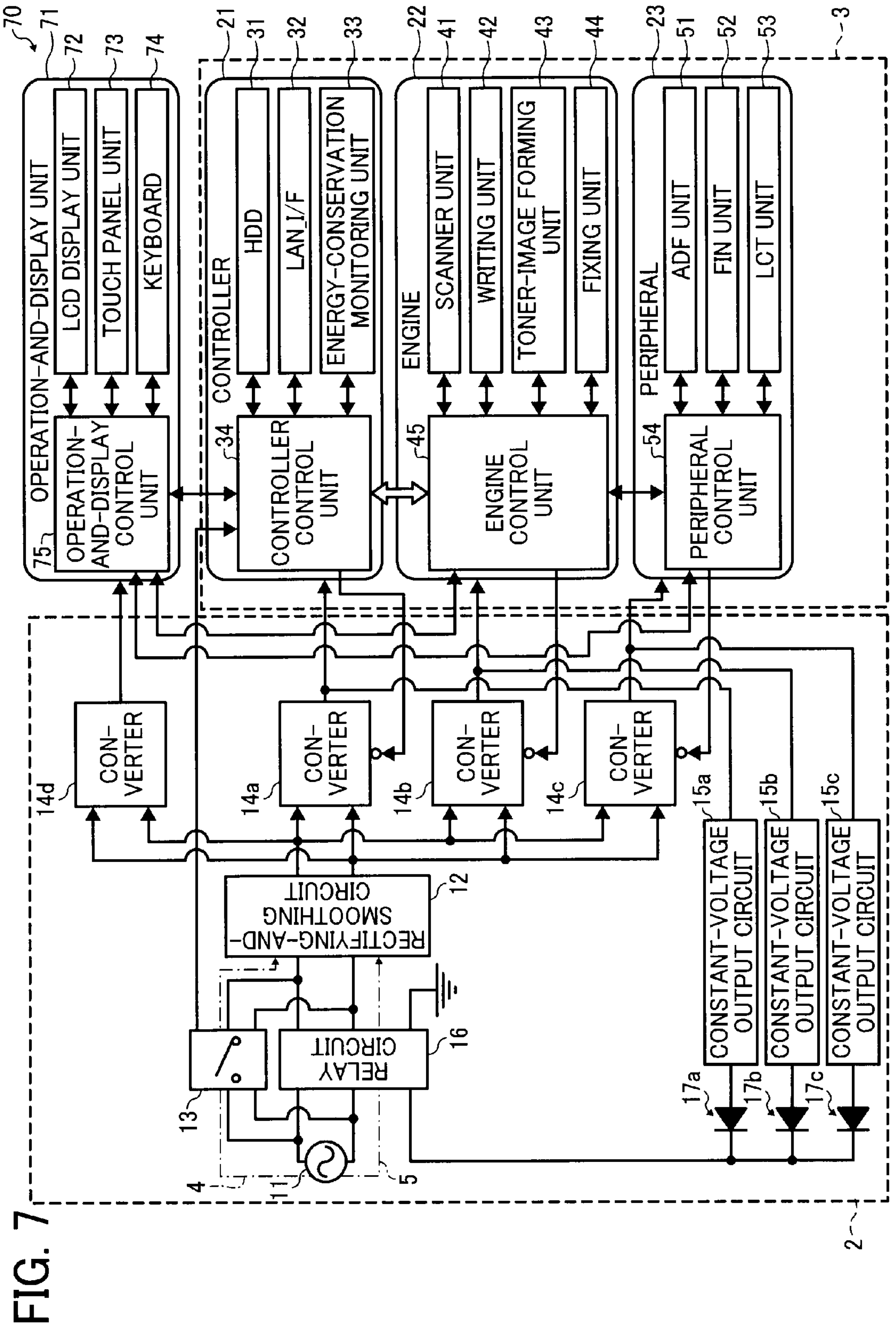
FIG. 7 is a block diagram of an image forming apparatus according to a third embodiment of the present invention.

As indicated in FIG. 7, the configuration of an image forming apparatus 70 according to the third embodiment differs from the configuration of the image forming apparatus 1 according to the first embodiment in additionally including an operation-and-display unit 71 that is connected via electrical wiring to the controller 21, the engine 22, and the peripheral 23 and a converter 14*d*, from which electric power is delivered to the operation-and-display unit 71. Because elements of the image forming apparatus 70 are similar to those of the image forming apparatus 1 except for the operation-and-display unit 71 and the converter 14*d*, the like elements are denoted by the same reference numerals and symbols, and only the configurations of the operation-and-display unit 71 and the converter 14*d* will be described below. The operation-and-display unit 71 serves as a display unit and an operation-and-display unit in aspects of the present invention.

The operation-and-display unit 71 includes an LCD display unit 72, a touch panel unit 73, a keyboard 74, and an operation-and-display control unit 75. The LCD display unit 72 is a device that displays various information pieces related to the image forming apparatus 70. The touch panel unit 73, which is provided on the LCD display unit 72, outputs information about coordinates of a point of touch on the LCD display unit 72 to the operation-and-display control unit 75. The keyboard 74 includes a plurality of operation-receiving keys and outputs a signal associated with a pressed operation-receiving key to the operation-and-display control unit 75. The operation-and-display control unit 75 includes an ASIC and an interface circuit for the ASIC that are similar to those of the controller 21. The operation-and-display control unit 75 controls operations performed by entirety of the operation-and-display unit 71 and outputs operation-input signals to the controller 21, the engine 22, and the peripheral 23 according to input signals fed from the touch panel unit 73 and the keyboard 74. The converter 14*d* converts a DC voltage output from the rectifying-and-smoothing circuit 12 into a voltage appropriate for driving the operation-and-display unit 71 and delivers the thus-converted voltage thereto.

The image forming apparatus 70 is configured such that in response to switching from on to off of the power switch 13, each of the controller 21, the engine 22, and the peripheral 23 performs its system-shutdown procedure and the operation-and-display control unit 75 displays running statuses (job that is currently performed or the like) of the system-shutdown procedures for the devices on the LCD display unit 72. If successful completion of the system-shutdown procedure has failed due to occurrence of some abnormality or the like, the operation-and-display control unit 75 displays information about the abnormal termination as error information on the LCD display unit 72.

If the system-shutdown procedure has been completed successfully, the corresponding device sends a notification about the successful completion of the system-shutdown procedure to the operation-and-display control unit 75 and then turns off output from the corresponding converter. Upon receiving the notification about completion of the system-shutdown procedure from the device, the operation-and-display control unit 75 displays information about the completion of the system-shutdown procedure. When all the devices have completed the system-shutdown procedures, the relay circuit 16 is placed in a contact-open state where output from the converter 14*d* is turned off and all the devices, including the operation-and-display unit 71, are cut off from the power supply.

As is clear from the description above, the image forming apparatus according to the third embodiment is configured such that the operation-and-display unit 71 displays running statuses of the system-shutdown procedure for each of the devices, a user can check running statuses of the system-shutdown procedures for the devices and connection statuses between the power supply 11 and the devices with ease.

Fourth Embodiment

The configuration of an image forming apparatus according to a fourth embodiment of the present invention will be described with reference to FIG. 8.

Figure 8:
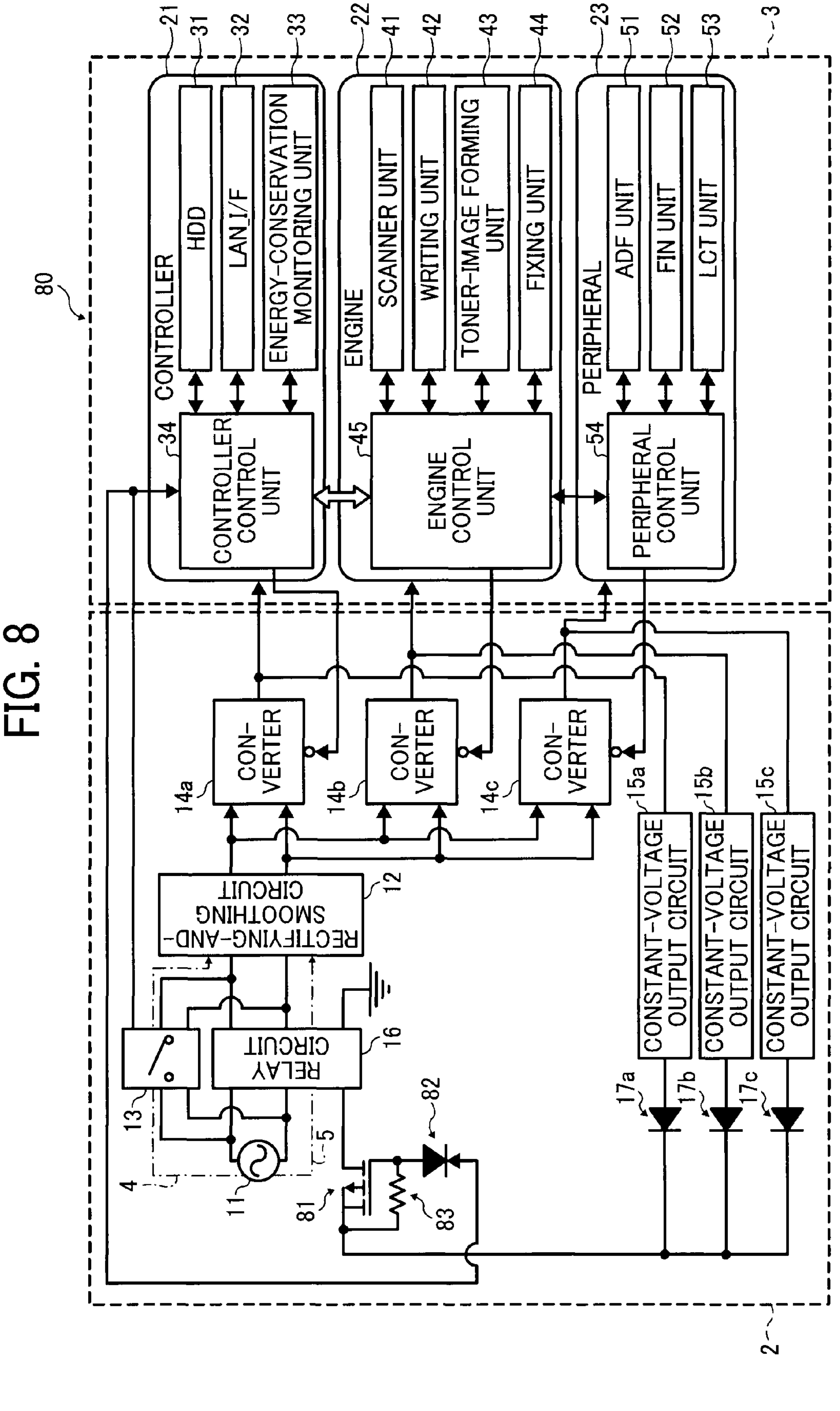
FIG. 8 is a block diagram of an image forming apparatus according to a fourth embodiment of the present invention.

As indicated in FIG. 8, the configuration of an image forming apparatus 80 according to the fourth embodiment differs from the configuration of the image forming apparatus 1 according to the first embodiment in additionally including a field effect transistor (FET) 81. Because elements of the image forming apparatus 80 are similar to those of the image forming apparatus 1 except for the FET 81, the like elements are denoted by the same reference numerals and symbols, and only the configuration of the FET 81 will be described below. The FET 81 serves as a switching unit in one aspect of the present invention.

The drain terminal of the FET 81 is connected to the constant-voltage output circuits 15*a*, 15*b*, and 15*c* via the diodes 17*a*, 17*b*, and 17*c*. The source terminal of the FET 81 is connected to the input terminal of the relay circuit 16. The gate terminal of the FET 81 is connected to the on/off-signal output terminal of the power switch 13 via a diode 82. A resistor 83 is connected to and between the drain terminal and the gate terminal of the FET 81. When the power switch 13 is on, the FET 81 is off to disconnect between the relay circuit 16 and the constant-voltage output circuits 15*a*, 15*b*, and 15*c*. In contrast, when the power switch 13 is off, the FET 81 is on to connect between the relay circuit 16 and the constant-voltage output circuits 15*a*, 15*b*, and 15*c*.

With this configuration, while the power switch 13 is on, because drive voltages are not delivered from the constant-voltage output circuits 15*a*, 15*b*, and 15*c* to the relay circuit 16, the relay circuit 16 is placed in a contact-open state where electric power is not supplied to the controller 21, the engine 22, and the peripheral 23. In contrast, in a situation where the power switch 13 is off and at least any one of outputs from the converters 14*a*, 14*b*, and 14*c* is on, drive voltages are delivered from the constant-voltage output circuits 15*a*, 15*b*, and 15*c* to the relay circuit 16. Accordingly, electric power is supplied via the relay circuit 16 to the controller 21, the engine 22, and the peripheral 23.

Hence, the image forming apparatus 80 according to the fourth embodiment is configured such that electric power is supplied via the relay circuit 16 to the controller 21, the engine 22, and the peripheral 23 only for a period of time from switch-off of the power switch 13 to completion of the system-shutdown procedures for the systems. This allows reduction in operating time of the relay circuit 16 of the image forming apparatus 80 as compared with that of the image forming apparatus 1 according to the first embodiment and hence reduction in power consumption of the image forming apparatus 80 during a standby period, an operating period, a period in an off-sleep mode, and the like periods.

In the fourth embodiment, the configuration that utilizes the transistor to control electric-power supply to the relay circuit 16 and open/close of the contact of the relay circuit 16 is employed; however, any configuration that does not use a transistor can alternatively be employed so long as the configuration causes the contact of the relay circuit 16 to be closed only for a period of time from switch-off of the power switch 13 to completion of the system-shutdown procedures.

As is clear from the description above, the image forming apparatus according to the fourth embodiment is configured such that the FET 81 allows electric power to be supplied to the controller 21, the engine 22, and the peripheral 23 via the relay circuit 16 only for a period of time from switch-off of the power switch 13 to completion of the system-shutdown procedures for the devices. This allows reduction in power consumption of the image forming apparatus 80 during a standby period, an operating period, a period in an off-sleep mode, and the like period.

Fifth Embodiment

The shutdown procedure for an image forming apparatus according to a fifth embodiment of the present invention will be described with reference to FIG. 9 to FIG. 11. The configuration of the image forming apparatus according to the fifth embodiment is similar to the image forming apparatus according to the first embodiment, and repeated descriptions are omitted.

How the controller 21, the engine 22, and the peripheral 23 operate when performing the shutdown procedure will be described below with reference to the flowcharts illustrated in FIG. 9 to FIG. 11. FIG. 9, FIG. 10, and FIG. 11 are a flowchart for operations performed by the controller 21, a flowchart for operations performed by the engine 22, and a flowchart for operations performed by the peripheral 23, respectively, each performing the shutdown procedure.

With reference to the flowchart illustrated in FIG. 9, how the controller 21 operates when performing the shutdown procedure will be described below.

Figure 9:
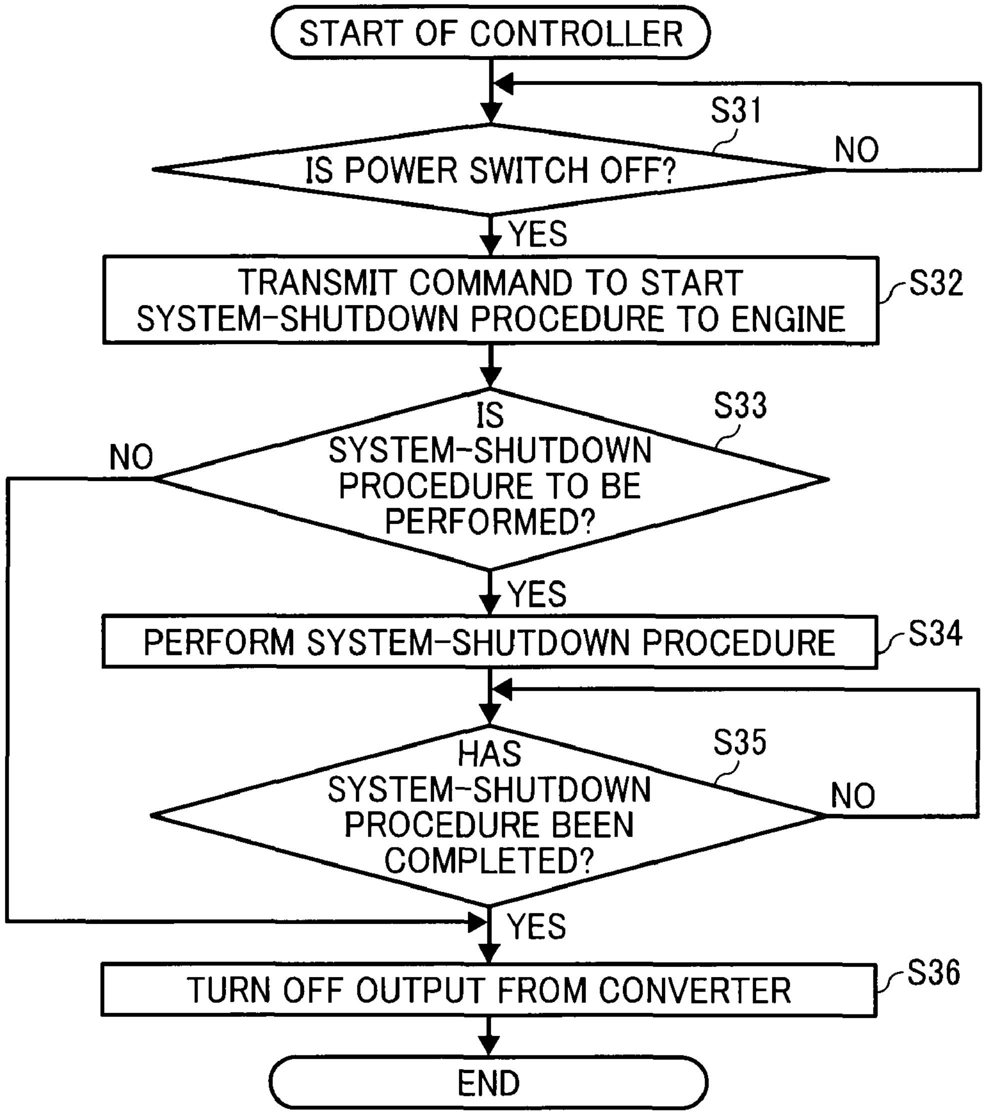
FIG. 9 is a flowchart for a shutdown procedure for a controller in an image forming apparatus according to a fifth embodiment of the present invention.

Control in the flowchart for the shutdown procedure illustrated in FIG. 9 starts at start of electric power supply from the converter 14*a* and proceeds to Step S31.

At Step S31, the controller control unit 34 determines, based on an on/off signal output from the power switch 13, whether the power switch 13 has been switched from on to off. Upon determining that the power switch 13 has been switched from on to off, the controller control unit 34 causes control to proceed to Step S32 in the shutdown procedure.

At Step S32, the controller control unit 34 transmits a command to start system-shutdown procedure to the engine 22 via the electrical wiring. When processing pertaining to Step S32 is thus completed, control proceeds to Step S33 in the shutdown procedure.

At Step S33, the controller control unit 34 determines whether it is necessary to perform the system-shutdown procedure based on preset information entered by a user. If the controller control unit 34 has determined that it is not necessary to perform the system-shutdown procedure, the controller control unit 34 causes control to proceed to Step S36 in the shutdown procedure. In contrast, if the controller control unit 34 has determined that it is necessary to perform the system-shutdown procedure, the controller control unit 34 causes control to proceed to Step S34 in the shutdown procedure.

At Step S34, the controller control unit 34 performs the system-shutdown procedure for the controller 21 of its own. When processing pertaining to Step S34 is thus completed, control proceeds to Step S35 in the shutdown procedure.

At Step S35, the controller control unit 34 determines whether the system-shutdown procedure has been completed. Upon determining that the system-shutdown procedure has been completed, the controller control unit 34 causes control to proceed to Step S36 in the shutdown procedure.

At Step S36, the controller control unit 34 causes the converter 14*a* that delivers electric power to the controller 21 to stop operating, thereby stopping electric power supply to the controller 21. When processing pertaining to Step S36 is thus completed, the shutdown procedure is completed.

With reference to the flowchart illustrated in FIG. 10, how the engine 22 operates when performing the shutdown procedure will be described below.

Figure 10:
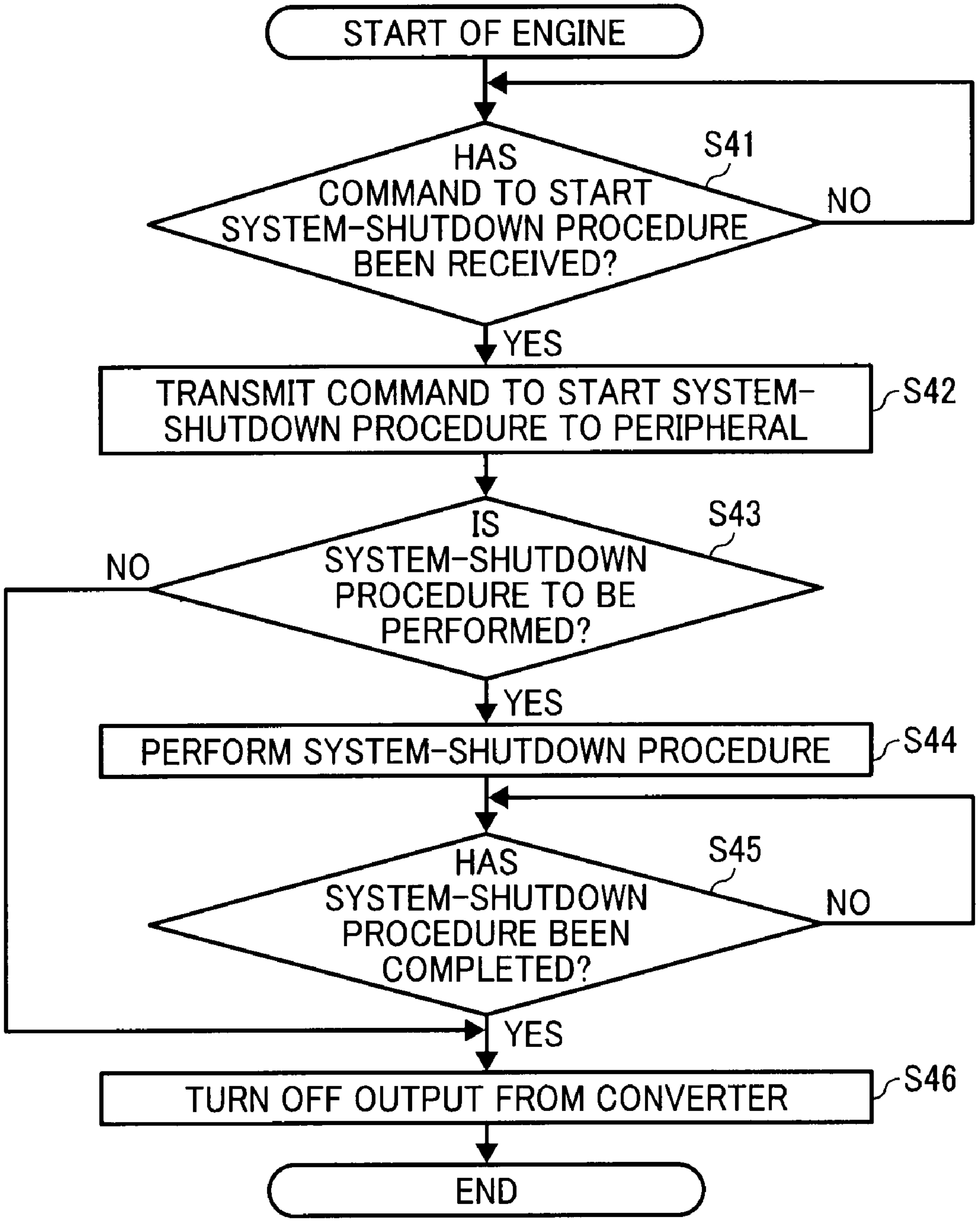
FIG. 10 is a flowchart for a shutdown procedure for an engine in the image forming apparatus according to the fifth embodiment.

Control in the flowchart for the shutdown procedure illustrated in FIG. 10 starts at start of electric power supply from the converter 14*b* and proceeds to Step S41.

At Step S41, the engine control unit 45 determines whether the command to start system-shutdown procedure has been received from the controller control unit 34. Upon receiving the command from the controller control unit 34, the engine control unit 45 causes control to proceed to Step S42 in the shutdown procedure.

At Step S42, the engine control unit 45 transmits a command to start system-shutdown procedure to the peripheral 23 via the electrical wiring. When processing pertaining to Step S42 is thus completed, control proceeds to Step S43 in the shutdown procedure.

At Step S43, the engine control unit 45 determines whether it is necessary to perform the system-shutdown procedure based on preset information entered by a user. If the engine control unit 45 has determined that it is not necessary to perform the system-shutdown procedure, the engine control unit 45 causes control to proceed to Step S46 in the shutdown procedure. In contrast, if the engine control unit 45 has determined that it is necessary to perform the system-shutdown procedure, the engine control unit 45 causes control to proceed to Step S44 in the shutdown procedure.

At Step S44, the engine control unit 45 performs the system-shutdown procedure for the engine 22 of its own. When processing pertaining to Step S44 is thus completed, control proceeds to Step S45 in the shutdown procedure.

At Step S45, the engine control unit 45 determines whether the system-shutdown procedure has been completed. Upon determining that the system-shutdown procedure has been completed, the engine control unit 45 causes control to proceed to Step S46 in the shutdown procedure.

At Step S46, the engine control unit 45 causes the converter 14*b* that delivers electric power to the engine 22 to stop operating, thereby stopping electric power supply to the engine 22. When processing pertaining to Step S46 is thus completed, the shutdown procedure is completed.

With reference to the flowchart illustrated in FIG. 11, how the peripheral 23 operates when performing the shutdown procedure will be described below.

Figure 11:
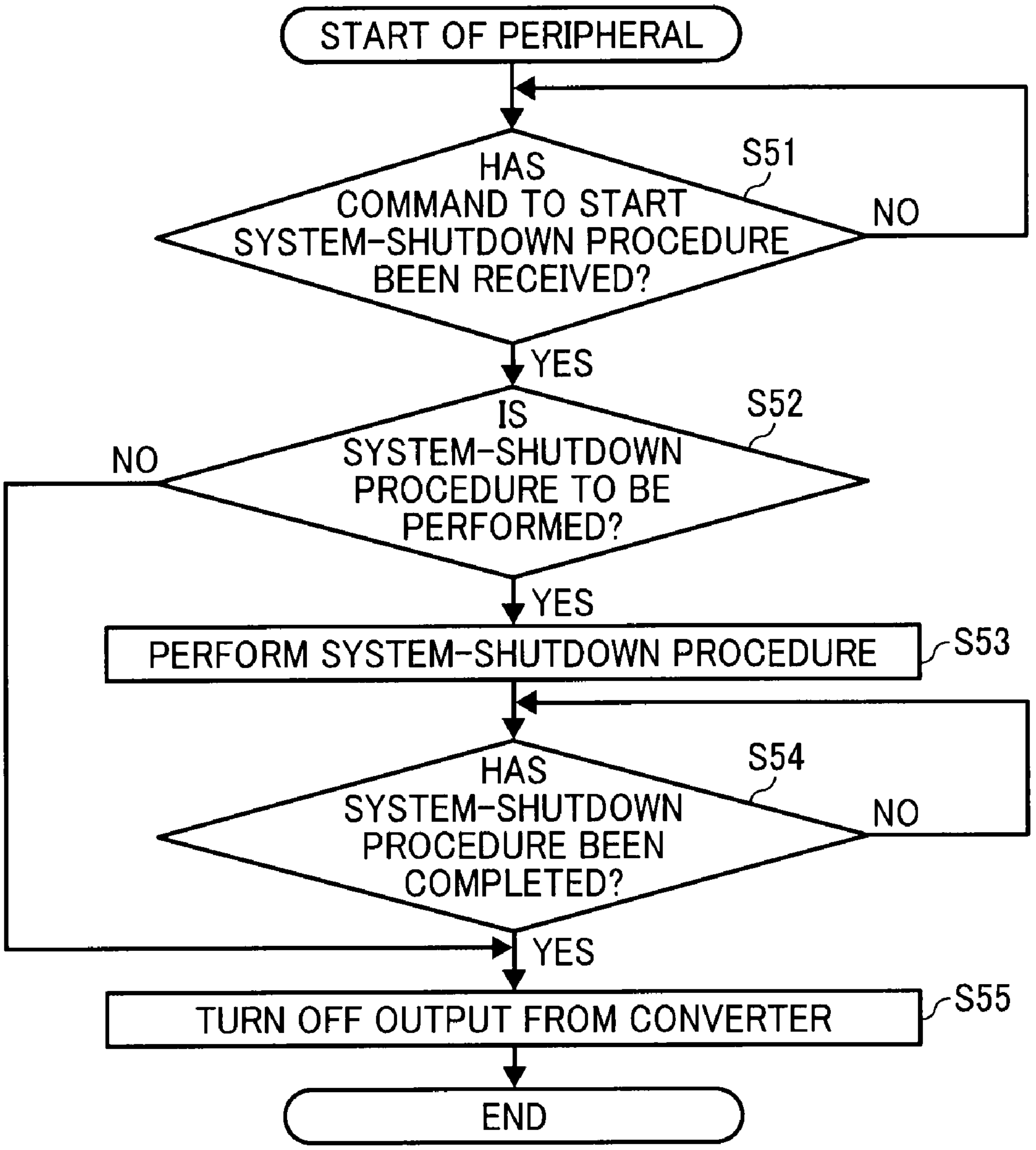
FIG. 11 is a flowchart for a shutdown procedure for a peripheral in the image forming apparatus according to the fifth embodiment.

Control in the flowchart for the shutdown procedure illustrated in FIG. 11 starts at start of electric power supply from the converter 14*c* and proceeds to Step S51.

At Step S51, the peripheral control unit 54 determines whether the command to start system-shutdown procedure has been received from the engine control unit 45. Upon receiving the command from the engine control unit 45, the peripheral control unit 54 causes control to proceed to Step S52 in the shutdown procedure.

At Step S52, the peripheral control unit 54 determines whether it is necessary to perform the system-shutdown procedure for the peripheral 23 based on preset information entered by a user. If the peripheral control unit 54 has determined that it is not necessary to perform the system-shutdown procedure, the peripheral control unit 54 causes control to proceed to Step S55 in the shutdown procedure. In contrast, if the peripheral control unit 54 has determined that it is necessary to perform the system-shutdown procedure, the peripheral control unit 54 causes control to proceed to Step S53 in the shutdown procedure.

At Step S53, the peripheral control unit 54 performs the system-shutdown procedure for the peripheral 23 of its own. When processing pertaining to Step S53 is thus completed, control proceeds to Step S54 in the shutdown procedure.

At Step S54, the peripheral control unit 54 determines whether the system-shutdown procedure has been completed. Upon determining that the system-shutdown procedure has been completed, the peripheral control unit 54 causes control to proceed to Step S55 in the shutdown procedure.

At Step S55, the peripheral control unit 54 causes the converter 14*c* that delivers electric power to the peripheral 23 to stop operating, thereby stopping electric power supply to the peripheral 23. Because all outputs from the converters 14*a*, 14*b*, and 14*c* are off at this stage, the relay circuit 16 is placed in a contact-open state where the engine 22, the controller 21, and the peripheral 23 are completely cut off from the power supply 11. When processing pertaining to Step S55 is thus completed, the shutdown procedure is completed.

Figure 12:
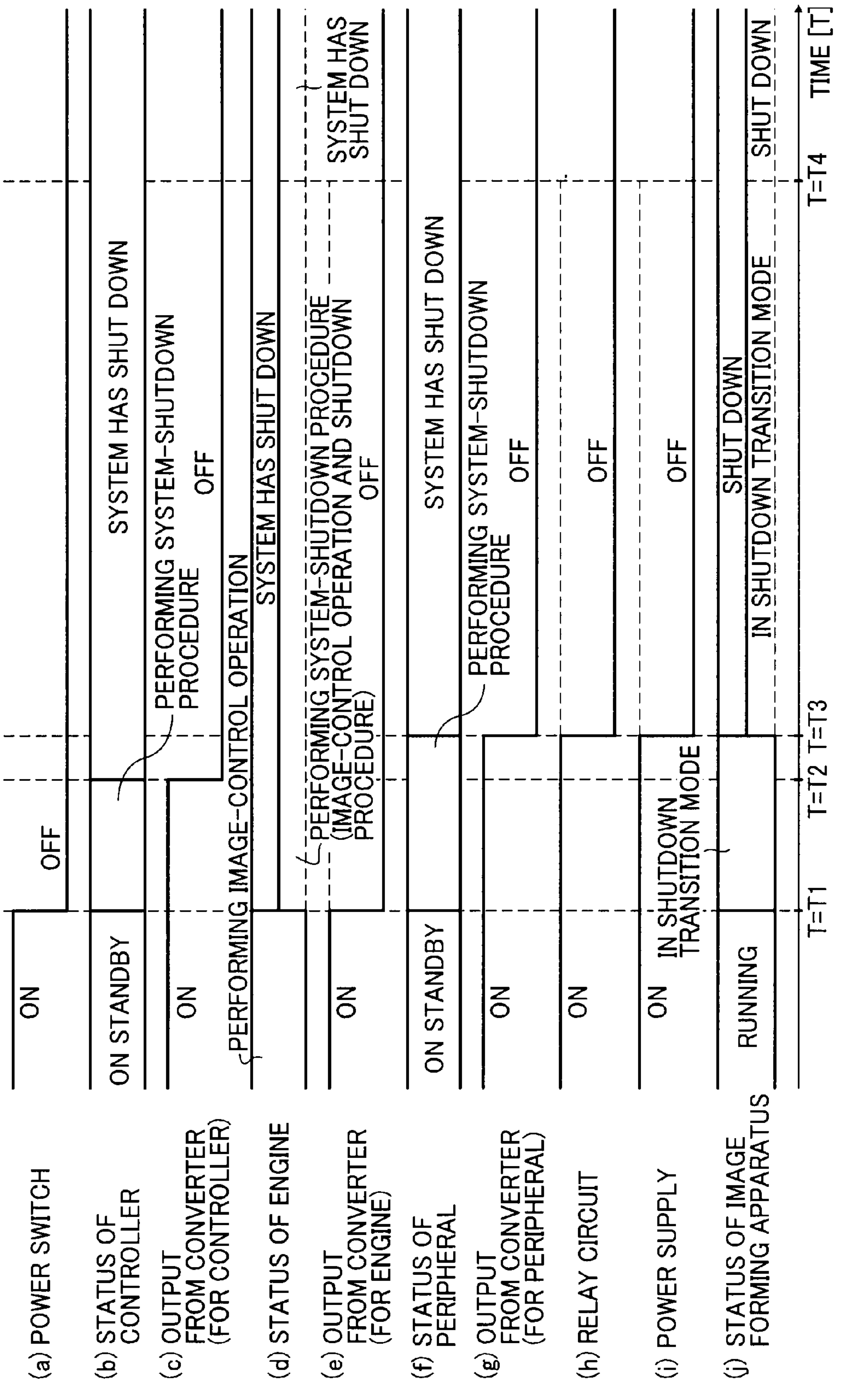
FIG. 12 is a timing diagram of an example shutdown procedure for the image forming apparatus according to the fifth embodiment.

A specific example of the shutdown procedure described above will be described with reference to a timing diagram illustrated in FIG. 12.

Assume that the power switch 13 is switched from on to off (T=T1, where T denotes time in FIG. 12) while the controller 21 and the peripheral 23 are on standby and the engine 22 is performing an image-control operation.

When the power switch 13 is switched from on to off, the controller 21, the engine 22, and the peripheral 23 independently perform their system-shutdown procedures in parallel to one another. Specifically, each of the controller 21, the engine 22, and the peripheral 23 determines whether it is necessary for the device to perform its system-shutdown procedure. In this example, the controller 21 and the peripheral 23 determine that it is necessary to perform their system-shutdown procedures, and perform only their basic shutdown procedures as their system-shutdown procedures as indicated in zones (b) and (f) in FIG. 5. In contrast, the engine 22 determines that it is not necessary to perform its system-shutdown procedure based on the preset information, and turns off output from the converter 14*b* immediately as indicated in zones (d) and (e) in FIG. 5.

This image forming apparatus is configured such that the controller 21 and the peripheral 23 are cut off from the power supply 13 upon completion of their system-shutdown procedures (T=T3, where T denotes time in FIG. 12), thereby allowing further reduction in power consumption as compared with the specific example illustrated in FIG. 5. Another configuration that allows a user to define whether to perform or skip each job (procedure) included in a system-shutdown procedure on a job-by-job basis can alternatively be employed. This alternative configuration allows secure shutdown of the system as well as reduction in power consumption.

As is clear from the description above, the image forming apparatus according to the fifth embodiment is configured such that whether to perform or skip the system-shutdown procedures can be set on a device-by-device basis, thereby achieving further reduction in power consumption as well as reduction in a period of time required for the shutdown procedure.

According to an aspect of the present invention, because systems control power supply to their own systems independently, further reduction in process power consumption can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
- a first electric-power supply path, through which electric power is supplied from a commercial electric power supply to the apparatus when the first electric-power supply path is in closed state;
- a detecting unit that detects whether the first electric-power supply path is in open state or in the closed state;
- a second electric-power supply path, through which electric power is supplied from the commercial electric power supply to the apparatus when, at least, the detecting unit has detected that the first electric-power supply path is in the open state; and a plurality of drive-voltage generating units, each of which converts a voltage fed from the electric power supply through any one of the first electric-power supply path and the second electric-power supply path into a predetermined drive voltage;

a plurality of systems, to each of which the drive voltage converted by a corresponding one drive-voltage generating unit of the drive-voltage generating units is fed, wherein each of the systems includes:

an execution unit that, when the detecting unit has detected that the first electric-power supply path is in the open state, performs a system-shutdown procedure on the drive voltage fed to the system through the second electric-power supply path and the corresponding one drive-voltage generating unit; and a stopping unit that causes the corresponding one drive-voltage generating unit to stop operating immediately when the execution unit has completed the system-shutdown procedure, and the second electric-power supply path stops supplying the electric power when all the drive-voltage generating units have been caused to stop operating.

2. The image forming apparatus according to claim 1, further comprising:

a first-path opening/closing unit that opens and closes the first electric-power supply path; and a second-path opening/closing unit that opens and closes the second electric-power supply path.

3. The image forming apparatus according to claim 2, wherein the second-path opening/closing unit places the second electric-power supply path in the closed state while any one of the drive-voltage generating units is operating.

4. The image forming apparatus according to claim 2, wherein the second-path opening/closing unit brings the second electric-power supply path into the closed state when the detecting unit has detected that the first electric-power supply path is in the open state.

5. The image forming apparatus according to claim 1, further comprising a display unit that displays running statuses of the system-shutdown procedures for the systems on a system-by-system basis.

6. The image forming apparatus according to claim 5, wherein the display unit is a light-emitting unit that is connected to the drive-voltage generating units, the display unit emitting light while at least one of the drive-voltage generating units is operating.

7. The image forming apparatus according to claim 5, wherein the display unit is an operation-and-display unit that receives an operating input and displays an operating status of the apparatus.

8. The image forming apparatus according to claim 7, wherein the second electric-power supply path allows supply of electric power to the corresponding one drive-voltage generating unit when the detecting unit has detected that the first electric-power supply path is in the open state, and stops the supply of electric power to the one drive-voltage generating unit immediately when all the drive-voltage generating units have been caused to stop operating.

9. The image forming apparatus according to claim 1, further comprising a setting unit that sets whether to perform or skip each of the system-shutdown procedures on a system-by-system basis, wherein the stopping unit of each of the systems causes, in a situation where the setting unit has set that the system-shutdown procedure of the system is to be skipped, the corresponding one drive-voltage generating unit to stop operating immediately when the detecting unit has detected that the first electric-power supply path is in the open state.

10. The image forming apparatus according to claim 9, wherein whether to perform or skip the system-shutdown procedure is user-configurable.

11. The image forming apparatus according to claims 1, wherein the system-shutdown procedure includes a procedure for completing an operation that has been during processing performed by the system when the detecting unit has detected that the first electric-power supply path is in the open state and a shutdown procedure of the entire system.

12. The image forming apparatus according to claim 11, wherein the operation that has been during processing by the system includes at least any one of an image-control operation, a paper-conveying operation, an image-forming operation, and a finishing operation.

13. The image forming apparatus according to claim 1, wherein the predetermined drive voltage generated by each one drive-voltage generating unit of the drive-voltage generating units is a drive voltage that is appropriate for a system corresponding to the one drive-voltage generating unit.

14. An image forming method in an image forming apparatus, the image forming apparatus that includes a first electric-power supply path, through which electric power is supplied from a commercial electric power supply to the apparatus when the first electric-power supply path is in closed state, a detecting unit that detects whether the first electric-power supply path is in open state or in the closed state, a second electric-power supply path, through which electric power is supplied from the commercial electric power supply to the apparatus when, at least, the detecting unit has detected that the first electric-power supply path is in the open state, a plurality of drive-voltage generating units, each of which converts a voltage fed from the electric power supply through any one of the first electric-power supply path and the second electric-power supply path into a predetermined drive voltage, and a plurality of systems, to each of which the drive voltage converted by a corresponding one drive-voltage generating unit of the drive-voltage generating units is fed, the image forming method comprising:

causing each of the systems to perform a system-shutdown procedure on the drive voltage fed to the system through the second electric-power supply path and the corresponding one of the drive-voltage generating units when the detecting unit has detected that the first electric-power supply path is in the open state;

causing each of the systems to cause the corresponding one drive-voltage generating unit to stop operating immediately when the execution unit has completed the system-shutdown procedure; and causing the second electric-power supply path to stop supplying the electric power when all the drive-voltage generating units have been caused to stop operating.

15. A computer program product comprising a non-transitory computer-usable medium having non-transitory computer-readable program codes embodied in the medium for controlling an image forming apparatus that includes a first electric-power supply path, through which electric power is supplied from a commercial electric power supply to the apparatus when the first electric-power supply path is in closed state, a detecting unit that detects whether the first electric-power supply path is in open state or in the closed state, a second electric-power supply path, through which electric power is supplied from the commercial electric power supply to the apparatus when, at least, the detecting unit has detected that the first electric-power supply path is in the open state, a plurality of drive-voltage generating units, each of which converts a voltage fed from the electric power supply through any one of the first electric-power supply path and the second electric-power supply path into a predetermined drive voltage, and a plurality of systems, to each of which the drive voltage converted by a corresponding one drive-voltage generating unit of the drive-voltage generating units is fed, the program codes when executed causing a computer to execute:

causing each of the systems to perform a system-shutdown procedure on the drive voltage fed to the system through the second electric-power supply path and the corresponding one of the drive-voltage generating units when the detecting unit has detected that the first electric-power supply path is in the open state;

causing each of the systems to cause the corresponding one drive-voltage generating unit to stop operating immediately when the execution unit has completed the system-shutdown procedure; and causing the second electric-power supply path to stop supplying the electric power when all the drive-voltage generating units have been caused to stop operating.

* * * * *